United States Patent
Holland

(10) Patent No.: US 7,530,465 B2
(45) Date of Patent: May 12, 2009

(54) WASTE RECYCLING BIN

(75) Inventor: Graeme Holland, New South Wales (AU)

(73) Assignee: Paper to Paper Australia Pty Ltd., Mona-Vale New South Wales (AU)

( * ) Notice: Subject to any disclaimer, the term of this patent is extended or adjusted under 35 U.S.C. 154(b) by 423 days.

(21) Appl. No.: 10/521,828

(22) PCT Filed: Jul. 18, 2003

(86) PCT No.: PCT/AU03/00924

§ 371 (c)(1),
(2), (4) Date: Oct. 21, 2005

(87) PCT Pub. No.: WO2004/009474

PCT Pub. Date: Jan. 29, 2004

(65) Prior Publication Data

US 2006/0138133 A1    Jun. 29, 2006

(30) Foreign Application Priority Data

Jul. 19, 2002    (AU)    .............................. 2002300193

(51) Int. Cl.
*A47G 19/00*    (2006.01)
*B65D 1/24*    (2006.01)
*B65D 6/28*    (2006.01)

(52) U.S. Cl. .................... 220/23.86; 220/505; 220/4.26
(58) Field of Classification Search .............. 220/23.86, 220/23.88, 23.89, 505, 4.26, 4.27
See application file for complete search history.

(56) References Cited

U.S. PATENT DOCUMENTS

| 2,747,388 | A | * | 5/1956 | Dolar | ......................... 220/524 |
| 3,446,386 | A | * | 5/1969 | Wellington | ................ 220/4.27 |
| 5,108,000 | A |   | 4/1992 | Stoll et al. | |
| 5,111,951 | A |   | 5/1992 | Breen et al. | |
| 5,445,397 | A | * | 8/1995 | Evans | ...................... 280/47.18 |

FOREIGN PATENT DOCUMENTS

AU    12019/76 B    9/1977

* cited by examiner

*Primary Examiner*—Anthony D Stashick
*Assistant Examiner*—Shawn M Braden
(74) *Attorney, Agent, or Firm*—Knobbe Martens Olson & Bear LLP

(57) ABSTRACT

A waste recycling bin has a first compartment adapted to receive recyclable waste paper, and at least a second compartment adapted to receive non-recyclable waste. Rim engaging flange portions support the second compartment against a portion of the rim of the first compartment such that the second compartment descends into the opening of the main body of the first compartment so as to form two openings to the first compartment on opposed sides of the second compartment for inserting waste paper therethrough.

7 Claims, 9 Drawing Sheets

WASTE RECYCLING BIN

FIELD OF THE INVENTION

The present invention relates to a waste recycling bin and, in particular, to a multi-compartment bin for separating used or discarded office paper from other waste in an office.

The invention has been developed primarily for use as an office paper recycling bin and will be described hereinafter with reference to this application. However, it will be appreciated that the invention is not limited to this particular field of use, and may also be applied to the disposal and temporary storage of other waste.

BACKGROUND OF THE INVENTION

Commonly, office waste paper is discarded by an office worker in simple, open bins. Accompanying the waste paper in the bins may be other refuse, such as food scraps, office items such as discarded paper clips and writing implements, and a range of other items that may or may not be of a recyclable nature. Where an effort is made in the office to separate recyclable items from non-recyclable items, the usual approach has been to provide a dedicated bin for each form of recyclable item. In its most basic form, the approach may simply require a bin for recyclable waste paper and a bin for all other items, such as food scraps, plastic, glass, wood, or metal, which may then be separated outside the office into recyclable and non-recyclable items. However, such an approach has met with limited success as it is conditional on the office worker making the effort to provide separate bins at easily accessible, preferably close together, locations and then ensuring that waste is properly distributed in the appropriate bins. The problem may be heightened by bins going missing, or by having bins with insufficient capacity or holding volume for the type of item disposed of therewithin which may lead to an office worker choosing to discard, say, food scraps in the waste paper bin if the food scraps bin is full.

Another problem associated with providing separate bins dedicated to receiving and storing different forms of waste, whether recyclable or otherwise, is the large amount of space taken up by the waste bins.

Waste containers or bins are disclosed in the prior art that seek to address these problems by providing a number of compartments in the one container or bin.

For example, U.S. Pat. No. 5,111,951 discloses a supplemental waste recycling container that can be mounted to the outside of a standard size, commercial wastebasket, thereby providing a dedicated outer compartment for receiving recyclable waste, whereas non-recyclable waste can be deposited within the wastebasket. Alternatively, the supplemental waste recycling container can be mounted to the inside of the wastebasket, thereby saving space around the wastebasket for other purposes whilst retaining two separate compartments that may be dedicated to receiving different forms of waste. Secure mounting of the supplemental waste recycling container is achieved without the need for hooks, clasps or other specialised and separately fitted mounting means which often fail due to breakage or loss of parts. Furthermore, the supplemental waste recycling container is easy to use and is less costly to manufacture than other supplemental waste recycling containers. However, when waste paper is released into the supplemental waste recycling container, the paper impacts with the floor of the container in such a manner that it is caused to fold. Such folding of paper reduces the available paper storage space in the supplemental container, and the supplemental container needs to be emptied more frequently than may be desired.

U.S. Pat. No. 5,417,338 discloses a compartmentalised waste container for segregating different types of waste, and is intended for use in a kitchen environment. The container is comprised of a floor supported large receptacle which supports a hollow shell having a closable lid. Two smaller receptacles are supported within the shell and overlie a part of the opening to the larger receptacle. A space between an outwardly and upwardly inclined front wall of the shell and the two smaller receptacles provides an inclined access passageway that permits a user to deposit refuse into the large receptacle via the access passageway or directly into either of the smaller receptacles by lifting the lid.

The provision of the inclined access passageway serves to facilitate the depositing of recyclable wastepaper into the large receptacle in a manner that will reduce the likelihood that the paper will settle folded therein. This will be due to the guiding effect of the inclined access passageway. However, the user must first lift the lid to gain access to the passageway with the consequence that the user is generally above the access passageway and will likely deposit the waste paper vertically or near vertically into the large receptacle. When this occurs, the waste paper will settle folded in the large receptacle as any guiding effect of the inclined access passageway will not come into play.

These and other examples of the prior art are not suited to provide a space-economical manner of storing waste paper. Nor are they suited to users depositing waste paper from a position laterally remote of the recyclable waste paper compartment of a multi-compartment waste recycling bin, as may typically be required of office personnel who locate waste bins underneath their desks.

It is, therefore, an object of the present invention to provide a multi-compartment waste recycling bin which can readily separate therewithin one form of waste, such as used or discarded office paper, from other forms of waste, for the purpose of facilitating the recycling of at least some of the waste.

It is a preferred object of the present invention to provide a multi-compartment, waste recycling bin that, when a user deposits waste paper into a recyclable waste paper compartment thereof from a position laterally remote of the compartment, will guide the paper to fall in a non-vertical direction to settle flat on a floor of the compartment.

Other objects and advantages of the present invention will become apparent from the following description, taken in connection with the accompanying drawings, wherein, by way of illustration and example, an embodiment of the invention is disclosed.

SUMMARY OF THE INVENTION

According to the present invention there is provided a waste recycling bin comprising a first compartment adapted to receive a first form of waste, and at least a second compartment adapted to receive a second form of waste, the first compartment including a main body having a floor, side walls, and a rim which defines an opening of the main body, the second compartment including a main body having a floor, side walls, a rim which defines an opening of the main body, and rim engaging means for supporting the second compartment against a portion of the rim of the first compartment so that the bin assumes an operable condition where the first and second forms of waste are receivable through the openings of respective first and second compartments, the rim engaging means so supporting the second compartment against a portion of the rim of the first compartment that at least a part of the main body of the second compartment descends into the opening of the main body of the first compartment, and wherein the portion of the rim of the first compartment that engages the rim engaging means of the second compartment is elevated from a remaining portion of the rim.

It is preferred that the rim engaging means defines a portion of the opening of the main body of the second compartment.

Preferably, the elevated portion of the rim of the first compartment is so disposed with respect to the remaining portion of the rim that there are two openings to the first compartment on opposed sides of the second compartment.

In a preferred form, the or each opening to the first compartment is defined by walls having an angulature that allows paper to be received from the side of the or each opening.

Preferably, there is a passageway defined between the main body of the first compartment and a first side wall of the main body of the second compartment through which the paper received through one of the two openings is guided to fall before settling flat upon a floor of the first compartment or upon other flatly laid paper.

DETAILED DESCRIPTION OF THE PREFERRED EMBODIMENT

Figure 1:
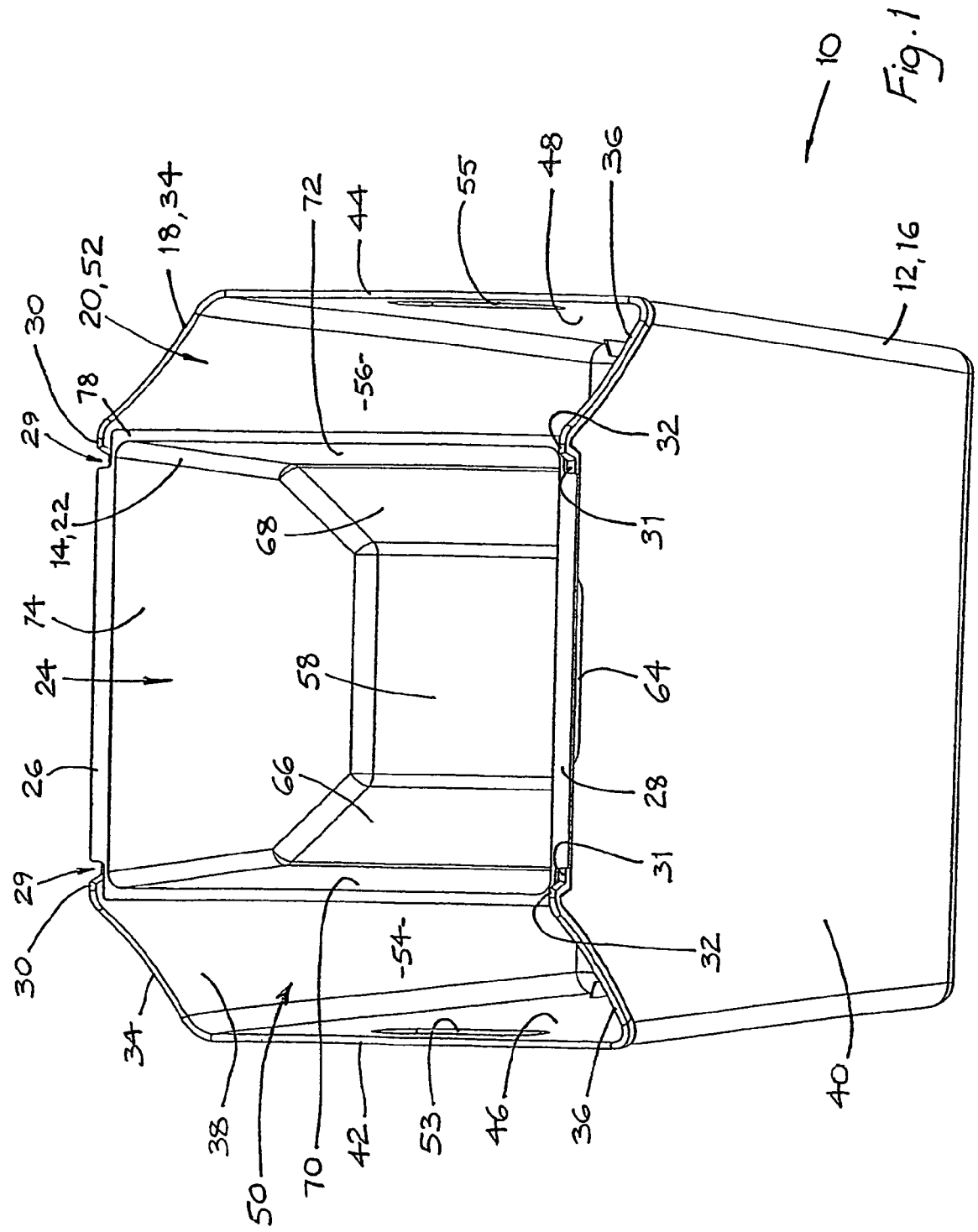
FIG. 1 is a top perspective view of a waste recycling bin according to a preferred embodiment of the invention in an operable condition for receiving first and second forms of waste separately therewithin.
Figure 2:
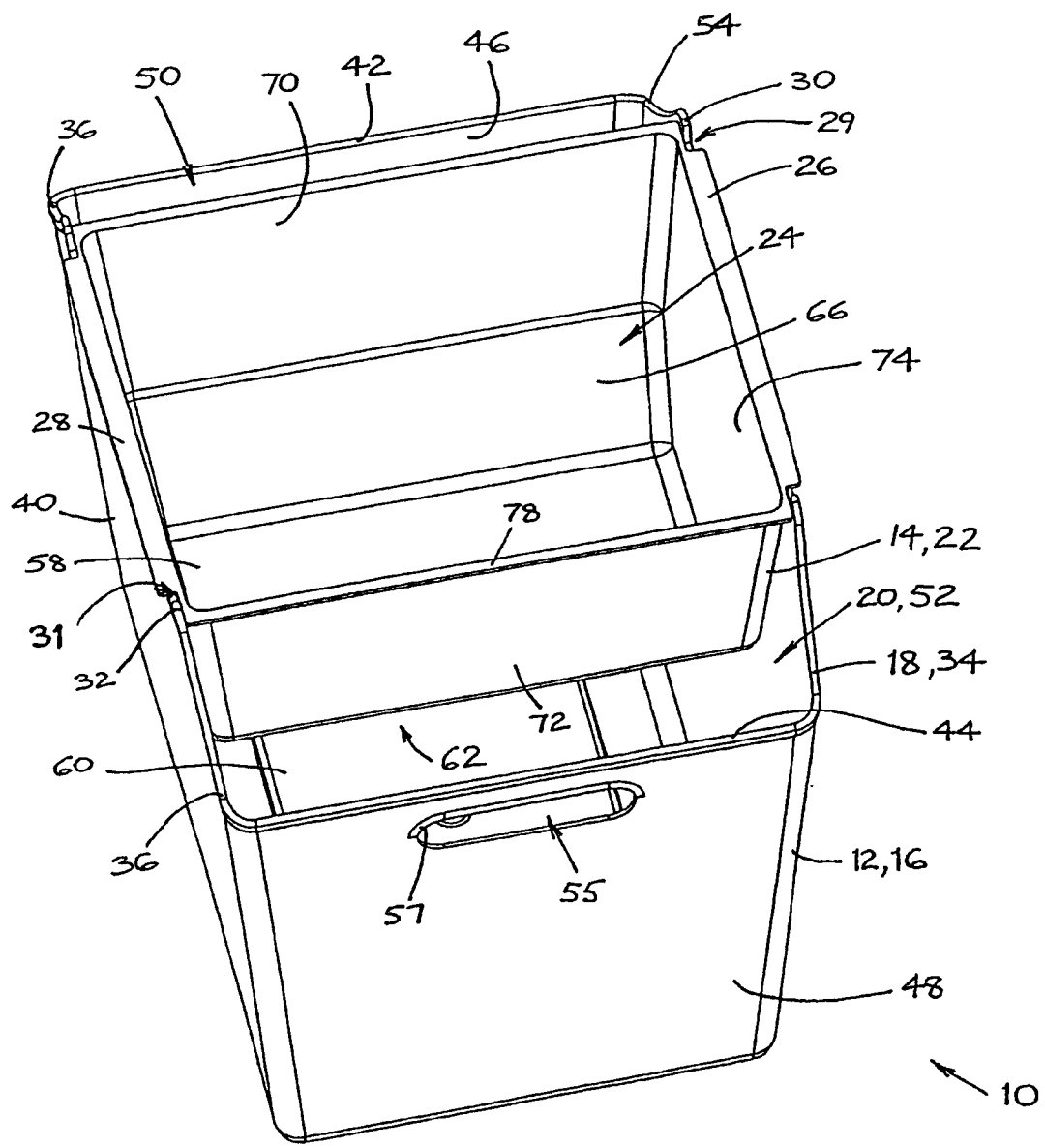
FIG. 2 is another top perspective view of the bin of FIG. 1.

The waste recycling bin 10 shown in an operable condition in FIGS. 1 and 2 has a first or primary compartment 12 and a second or secondary compartment 14. The primary compartment 12 is adapted to receive office waste paper and the secondary compartment 14 is adapted to receive other items for which recycling may not be required; such as food scraps, drink containers and discarded office items. If food scraps are to be received in the secondary compartment 14, it should be lined with a plastic bag.

Figure 3:
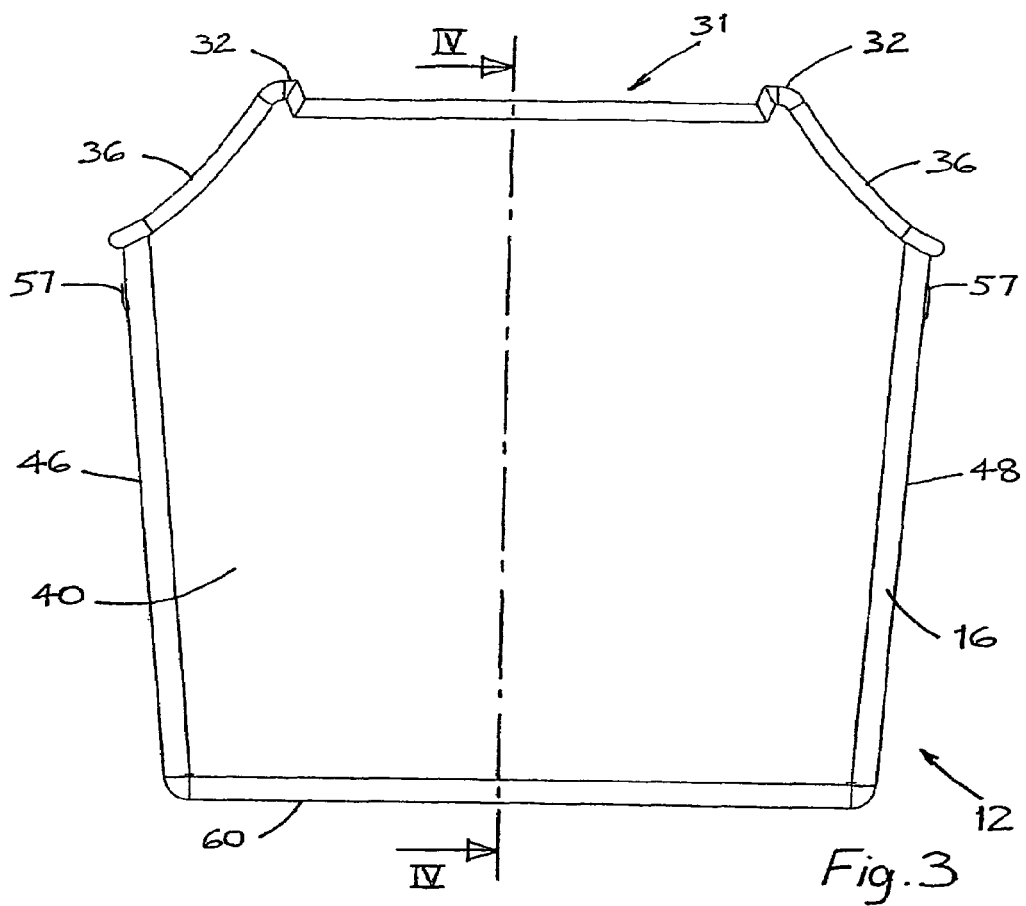
FIG. 3 is a side view of a first compartment used in the bin of FIGS. 1 and 2.
Figure 4:
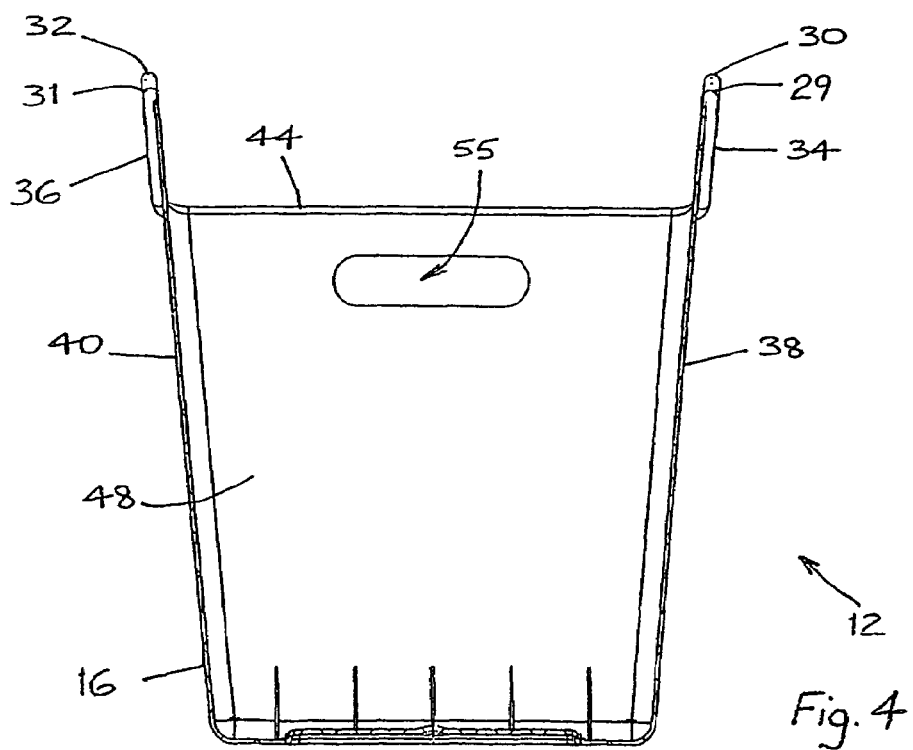
FIG. 4 is a sectional end view through IV-IV of the first compartment shown in FIG. 3.
Figure 5:
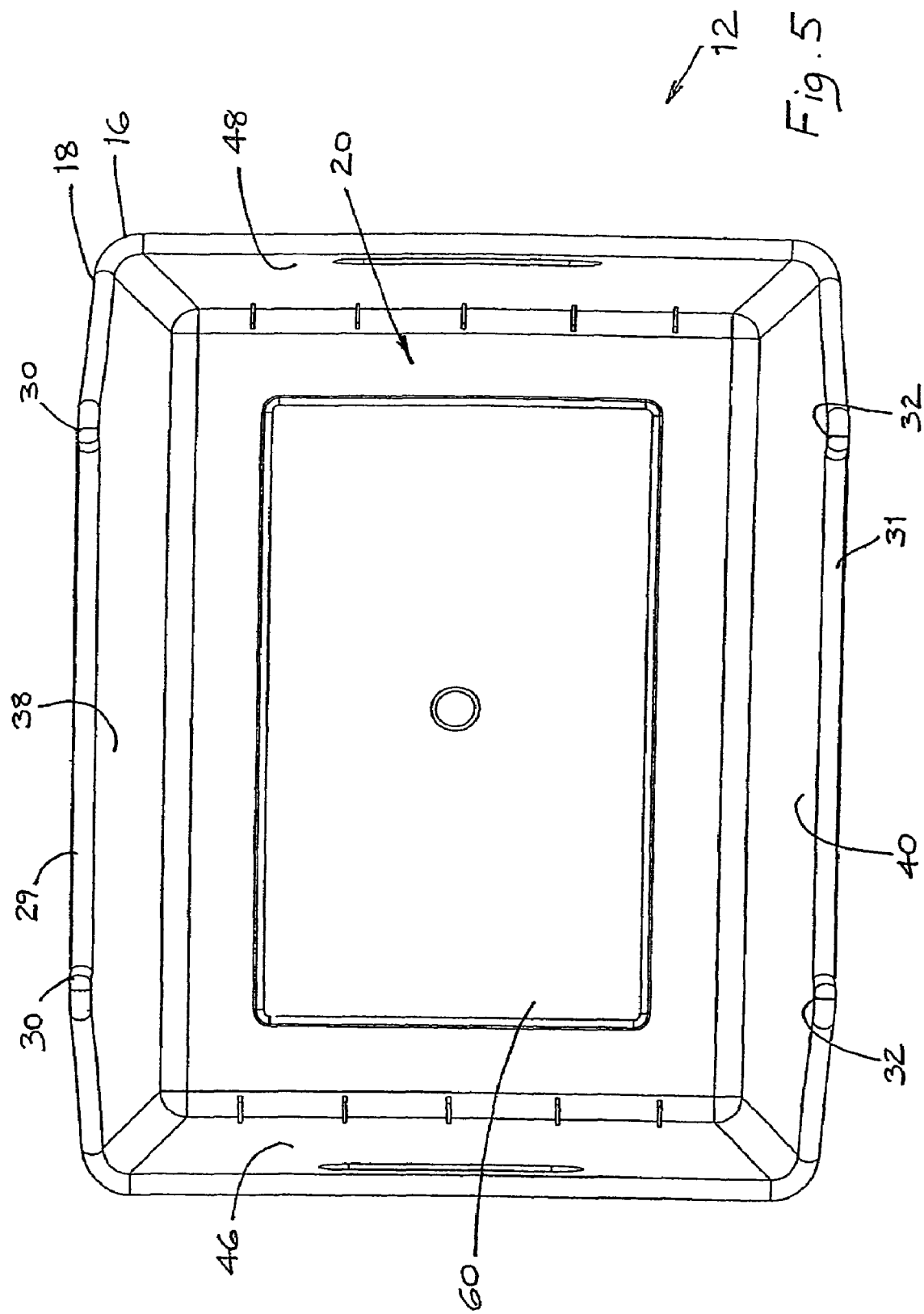
FIG. 5 is a top view of the first compartment shown in FIG. 3.
Figure 6:
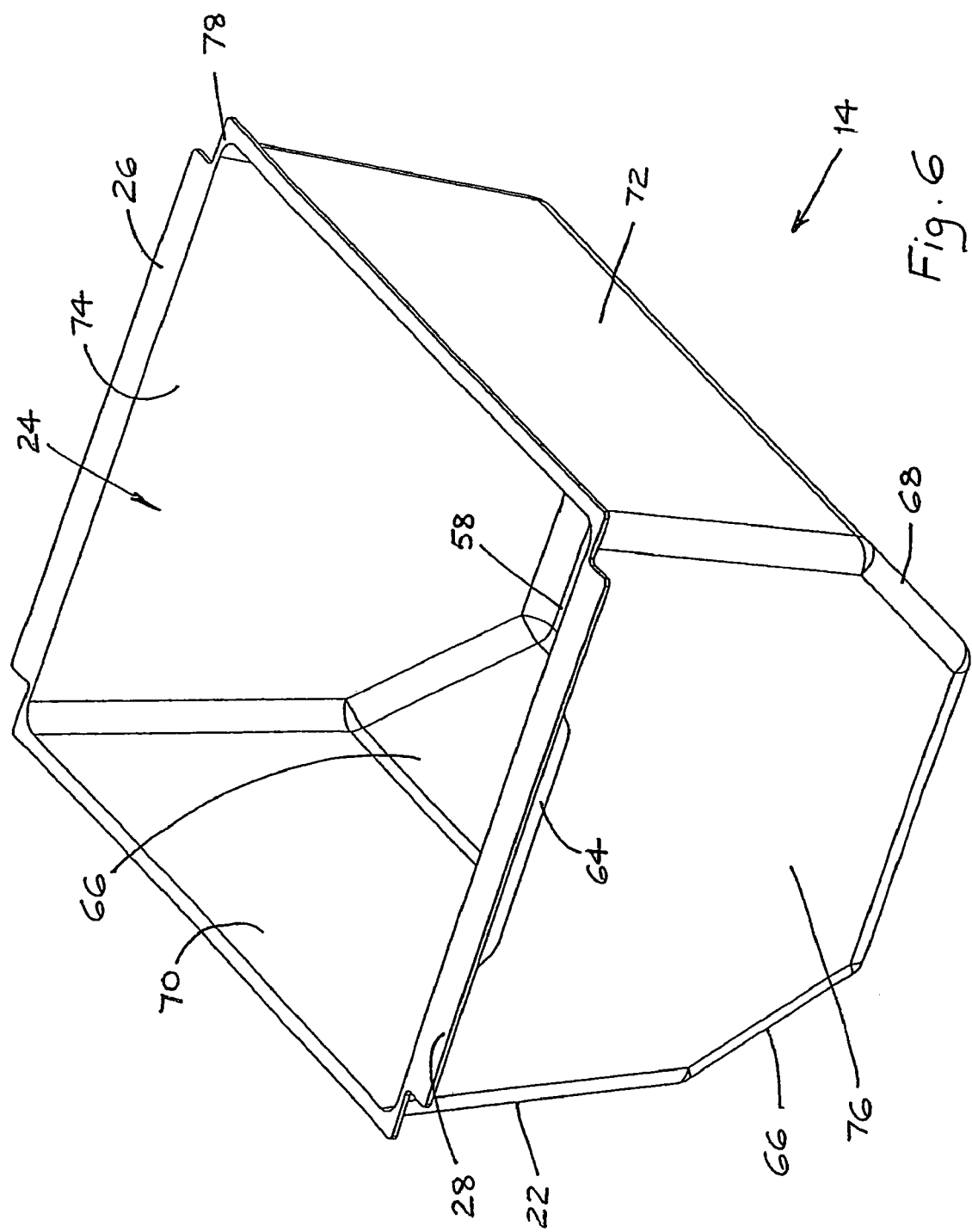
FIG. 6 is a top perspective view of a second compartment used in the bin of FIGS. 1 and 2.
Figure 7:
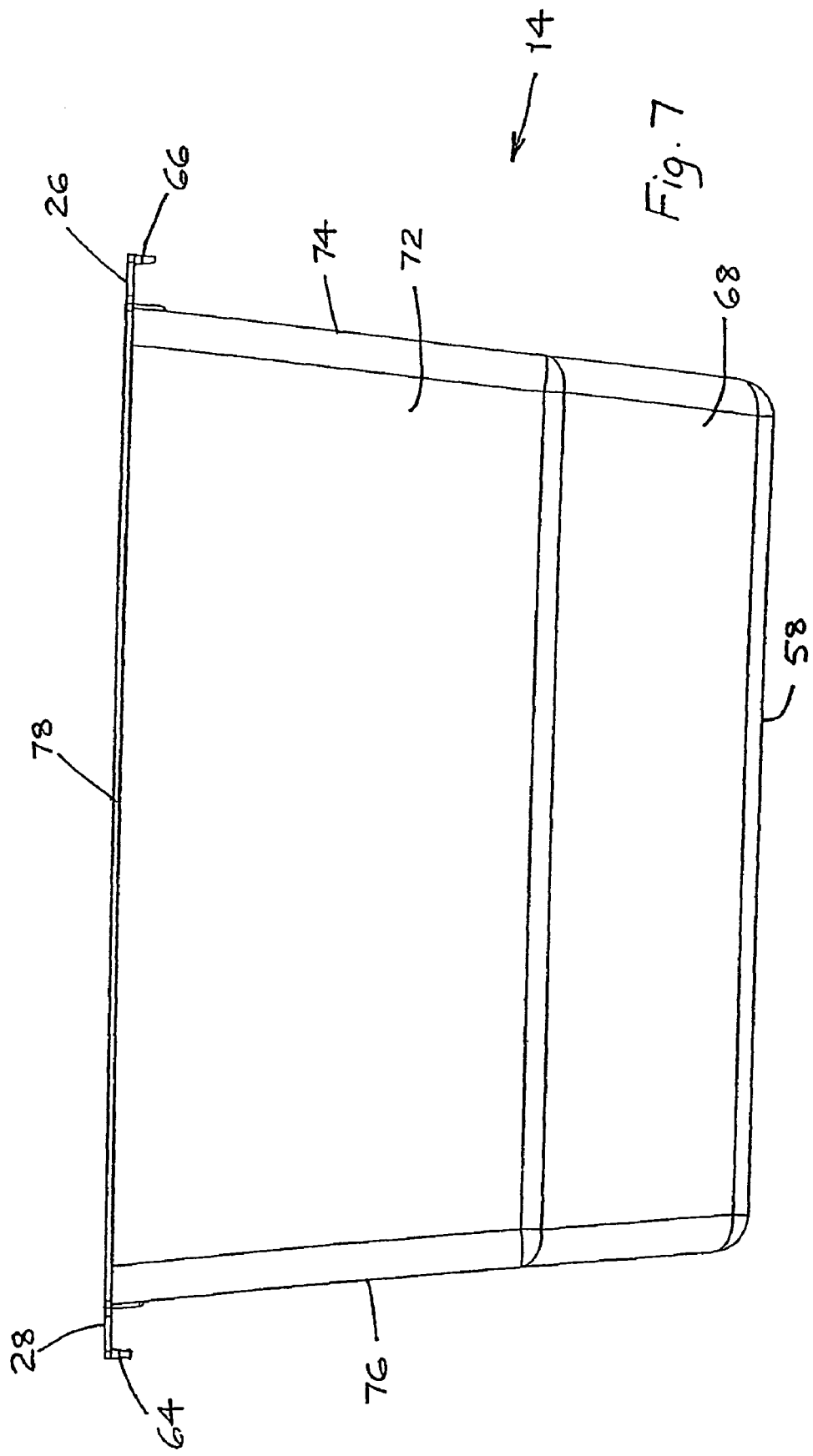
FIG. 7 is a side view of the second compartment shown in FIG. 6.
Figure 8:
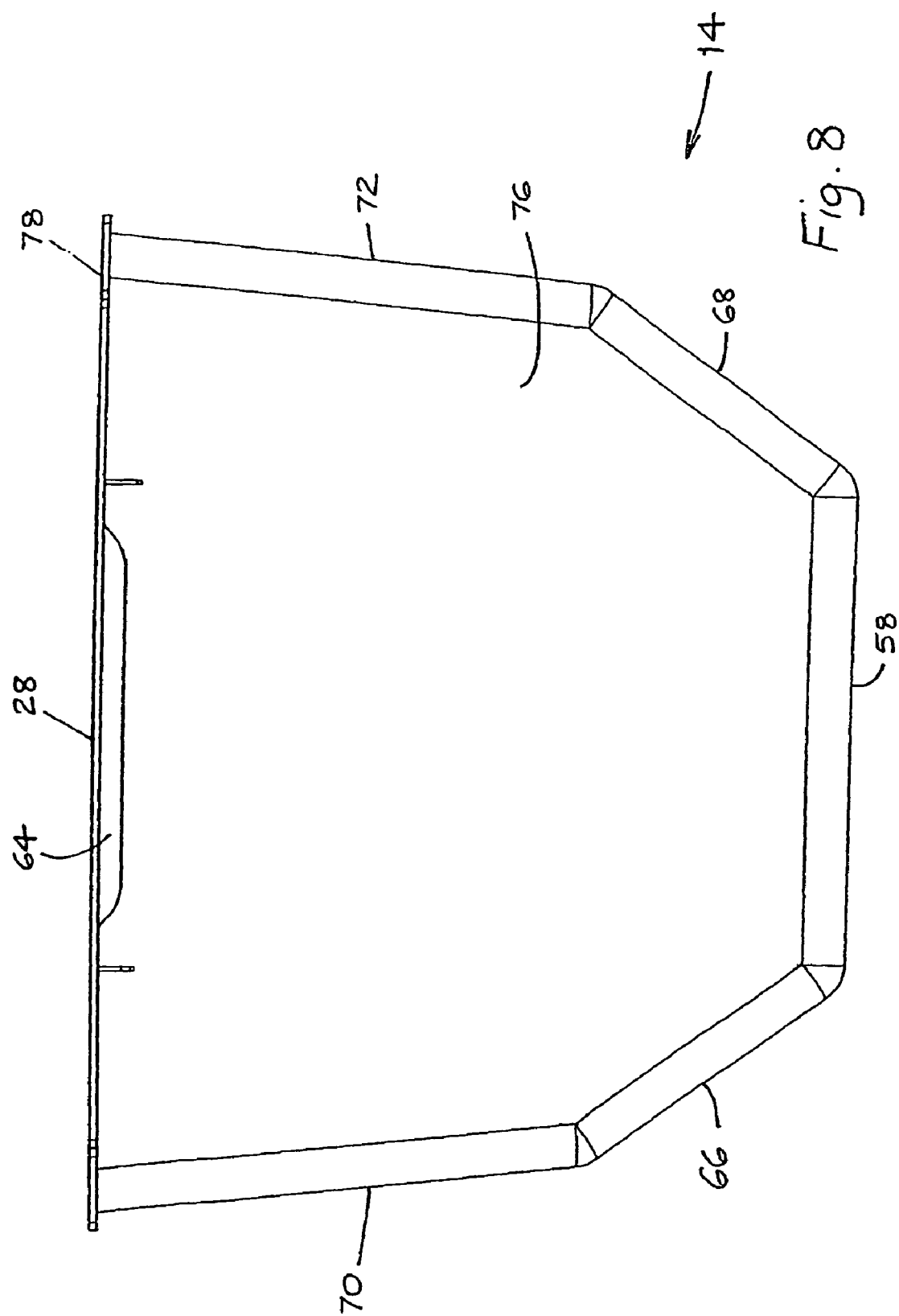
FIG. 8 is an end view of the second compartment shown in FIG. 6.

The primary compartment 12 (see FIGS. 3 to 5) has a main body 16 having a floor 60, side walls 38, 40, 46, 48, and a rim 18 which defines an opening 20 of the main body 16. The secondary compartment 14 (see FIGS. 6 to 8) also has a main body 22 having a floor 58, side walls 70, 72, 74, 76, a rim 78 which defines an opening 24 of the main body 22, and rim engaging means in the form of outwardly projecting flange portions 26, 28 on opposed sides of the opening 24 which are adapted to be engaged against locating recesses 29, 31 formed continuously along respective elevated rim portions 30, 32 at opposed sides of the rim 18 of the main body 16 of the primary compartment 12. In this way, all of the main body 22 of the secondary compartment 14 descends from the elevated rim portions 30, 32 of the rim 18 into the opening 20 of the main body 16 of the primary compartment 12. Each of the elevated rim portions 30, 32 are located intermediate the opposed ends of their respective rim segment 34, 36 provided by the upper edges of their respective side walls 38, 40. The portions of the rim segment 34 located on opposed sides of the elevated portion 30 are downwardly sloping, and the portions of the rim segment 36 located on opposed sides of the elevated portion 32 are downwardly sloping, with the result that the other rim segments 42, 44 provided by the upper edges of their respective side walls 46, 48 are below the opening 24 of the main body 22 of the secondary compartment 14 whereby, when the secondary compartment 14 is supported against the elevated rim portions 30, 32 of the primary compartment 12, there are formed two openings 50, 52 to the primary compartment 12 on opposed sides of the secondary compartment 14 for inserting waste paper therethrough.

There are grip facilitating apertures 53, 55 cut out of respective side walls 46, 48, and a hand guard 57 (see FIG. 2) connected to the upper edge of each of the apertures 53, 55.

There are downwardly projecting, locating flaps 64, 65 extending from respective flange portions 26, 28 for reliably locating the secondary compartment 14 upon the primary compartment 12.

The depth, and hence holding capacity, of the secondary compartment 14 is substantially less than that of the primary compartment 12, and so the floor 58 of the secondary compartment 14 is considerably raised from the floor 60 of the primary compartment 12 when the bin 10 is in an operable condition.

The volume of the space 62 defined between the floors 58 and 60 has the capacity to hold a large quantity of A4 size paper when each discarded paper is laid flat upon the preceding one. The discarded paper may be conveniently inserted by the office worker through either of the two openings 50, 52, from the side of the openings laterally remote of the bin 10 given the angulature of the walls that define the openings 50, 52. The bin 10 may advantageously be used by office personnel working side by side or in close proximity where there may be insufficient space to locate two separate bins. For this purpose, the bin 10 is able to be fed with waste paper from two sides, where respective personnel may be working, especially in some parts of Asia.

Once released from the office worker's grip, the paper will be guided to fall through a selected passageway 54, 56 between the main body 22 of the secondary compartment 14 and the main body 16 of the primary compartment 12, before settling flat upon the floor 60 or upon other flatly laid paper. The guided fall of the paper is facilitated by the opposed bevelled corner walls 66, 68 of the secondary compartment 14.

Figure 9:
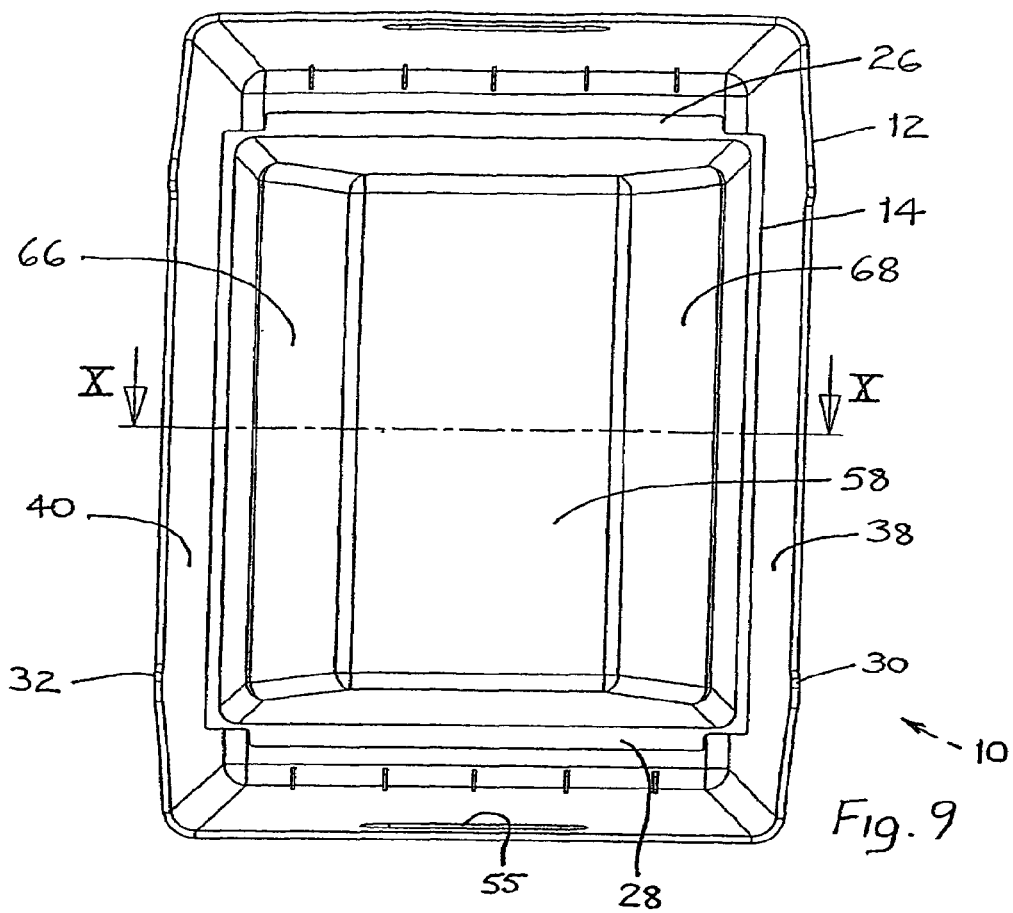
FIG. 9 is a plan view of the waste recycling bin of FIGS. 1 and 2, but in a nested condition.
Figure 10:
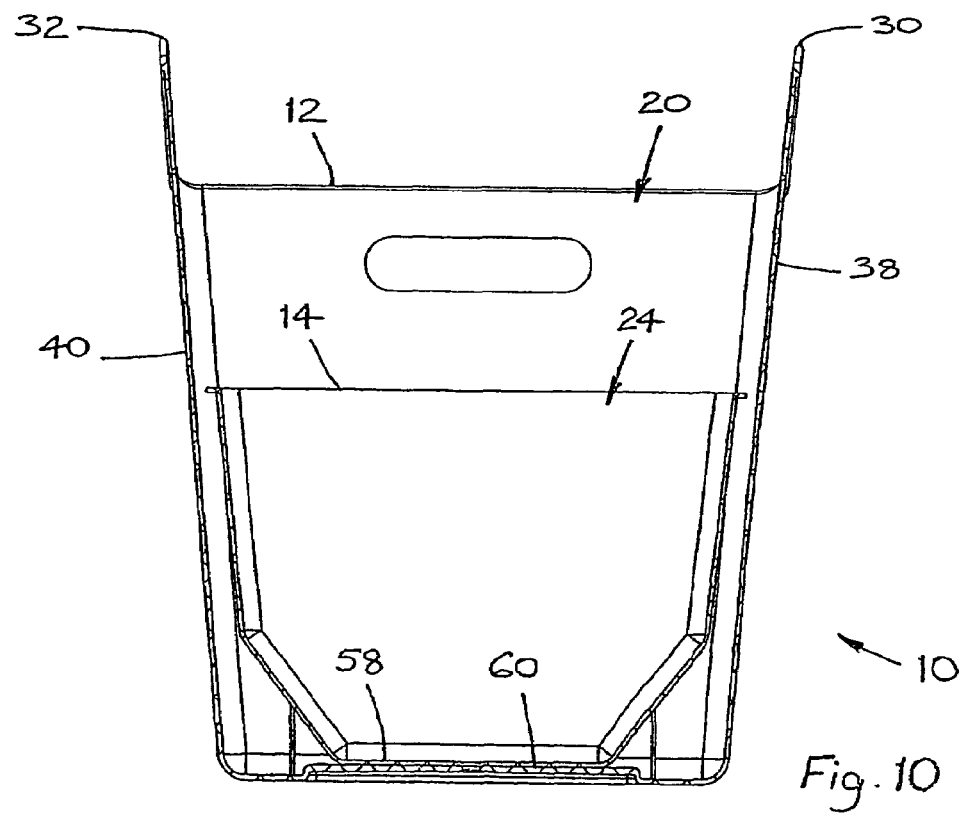
FIG. 10 is a sectional view taken through X-X of the bin shown in FIG. 9.

The waste recycling bin 10 is shown in a nested condition in FIGS. 9 and 10 for ease of storage and transportation. Numerals used to refer to features in FIGS. 1 to 8 have been used to refer to like features in FIGS. 9 and 10. The bin 10 has had all waste removed therefrom and the secondary compartment 14 has been released from the elevated rim portions 30, 32 of the primary compartment 12 and is now supported upon the floor 60 of the primary compartment 12. In order to be supported upon the floor 60, the secondary compartment 14 must be raised sufficiently from the primary compartment 12 so that it can be turned 90° in a horizontal direction and then lowered within the primary compartment 12, whereby the closely corresponding dimensional configurations of the primary and secondary compartments 12, 14 allow the secondary compartment 14 to snugly fit within the primary compartment 12, as particularly shown in FIG. 10. In this nested condition, the floor 58 of the secondary compartment 14 rests upon the floor 60 of the primary compartment 12.

Figure 11:
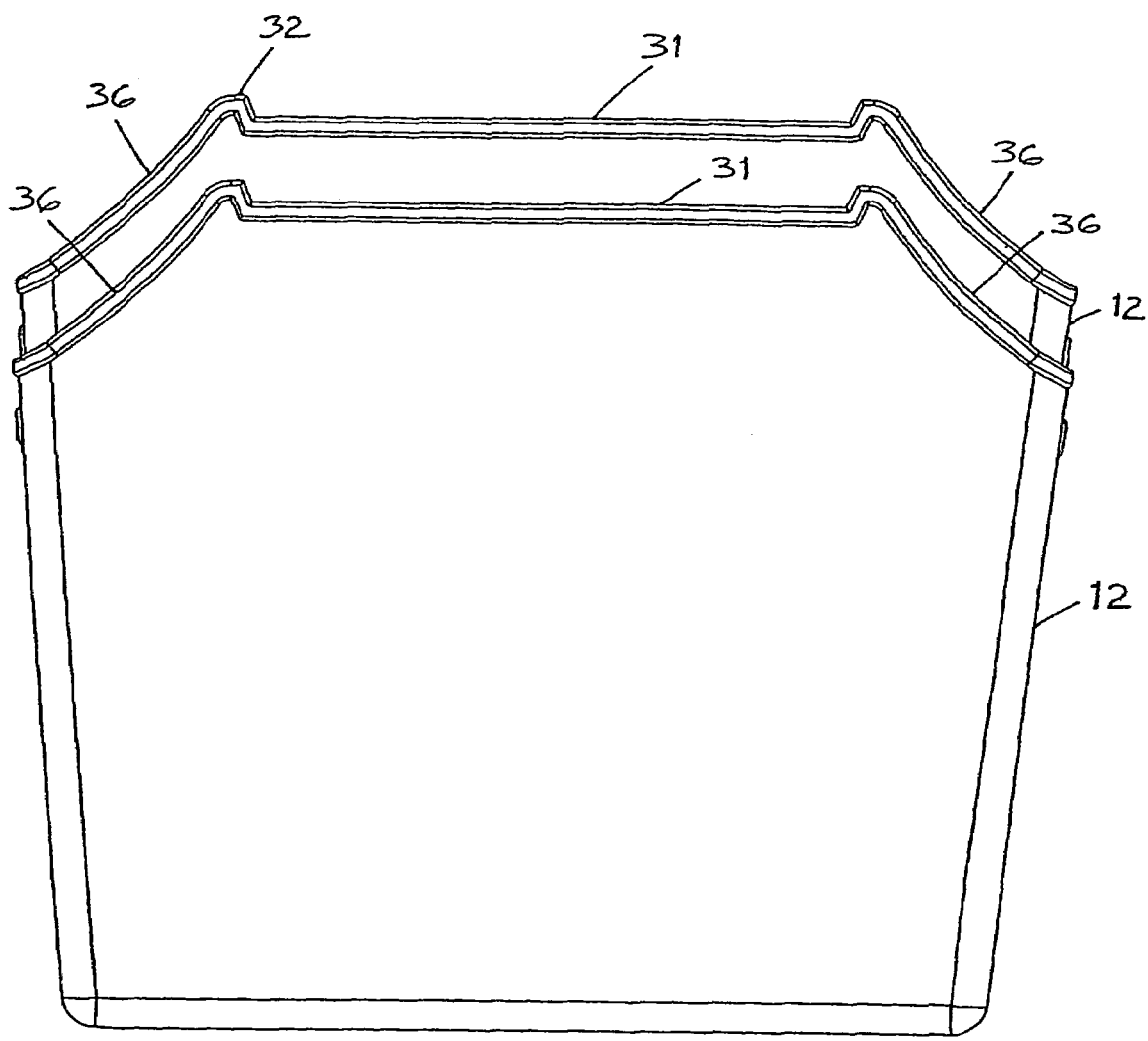
FIG. 11 is a side view of a stacked arrangement of first compartments of another preferred bin.

A plurality of primary compartments 12 may be nestable one within another to provide a stacked arrangement of primary compartments (as shown in FIG. 11) for ease of storage and transportation. A similar stacked arrangement of secondary compartments 14 can also be achieved.

Both the primary compartment 12 and the secondary compartment 14 are preferably fabricated of polypropylene by an injection moulding process.

Various modifications may be made in details of design and construction without departing from the scope and ambit of the invention.

The invention claimed is:

1. A lidless waste recycling bin comprising a first compartment adapted to receive a first form of waste, and at least a second compartment adapted to receive a second form of waste, the first compartment including a main body having a floor, side walls, end walls and a rim which defines an opening of the main body, the second compartment including a main body having a floor, side walls, end walls, a rim which defines an opening of the main body, and rim engaging means for supporting the second compartment against a portion of the rim of the first compartment so that the bin assumes an operable condition where the first and second forms of waste are receivable through the openings of respective first and second compartments, the rim engaging means supporting the second compartment against a portion of the rim of the first compartment so that at least a substantial part of the main body of the second compartment descends into the opening of the main body of the first compartment, and wherein the portion of the rim of the first compartment that engages the rim engaging means of the second compartment is elevated from a remaining portion of the rim and wherein the elevated portion of the first compartment that engages the rim engaging means of the second compartment comprises two opposed elevated rim portions of opposed side walls, wherein the side walls define angled portions on each side of each elevated portion which descend to the two end walls and wherein the elevated portion of the rim of the first compartment is so disposed with respect to the remaining portion of the rim that there are two openings to the first compartment on opposed sides of the second compartment which may simultaneously receive paper therethrough.

2. The bin of claim 1 wherein the rim engaging means defines a portion of the opening of the main body of the second compartment.

3. The bin of claim 1 wherein each opening to the first compartment is defined by walls having an angulature that allows paper to be received from the side of the or each opening.

4. The bin of claim 1 wherein there is a passageway defined between the main body of the first compartment and a first end wall of the main body of the second compartment and wherein a bevelled corner wall is defined between the first side wall and the floor of the second compartment that facilitates the guided fall of paper through the passageway before settling flat upon the floor of the first compartment or upon other flatly laid paper.

5. The bin of claim 1 wherein each of the two elevated rim portions have respective locating recesses formed continuously therealong.

6. The bin of claim 5 wherein the rim engaging means of the second compartment comprise outwardly projecting flange portions of opposed side walls, and each of the flange portions are engaged against the respective locating recesses of the elevated rim portions.

7. The bin of claim 4 wherein the secondary compartment includes opposed bevelled corner walls that facilitate the guided fall of paper.

* * * * *